Dec. 14, 1937.                H. WALLACE                2,102,446
                              RIBBON REEL
                          Filed March 11, 1937
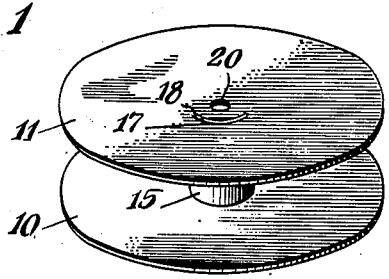
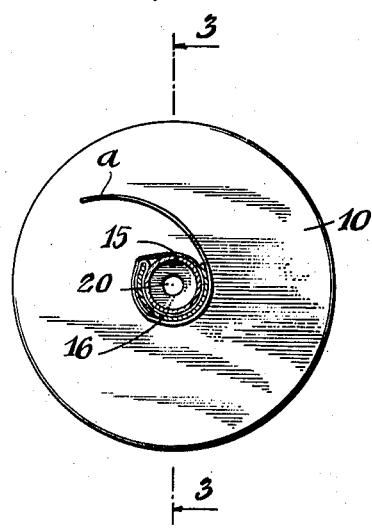
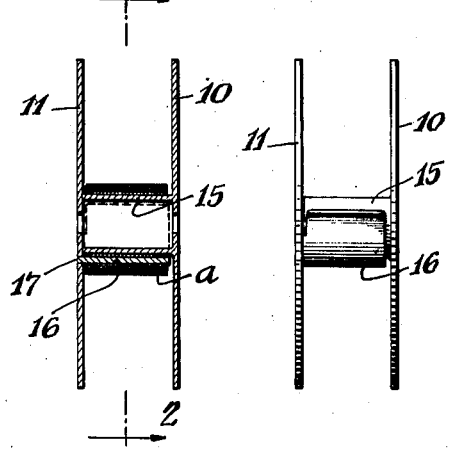
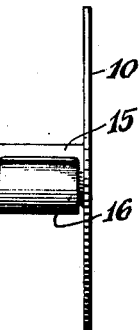
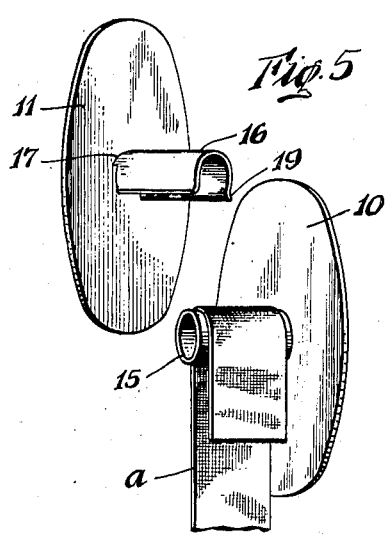
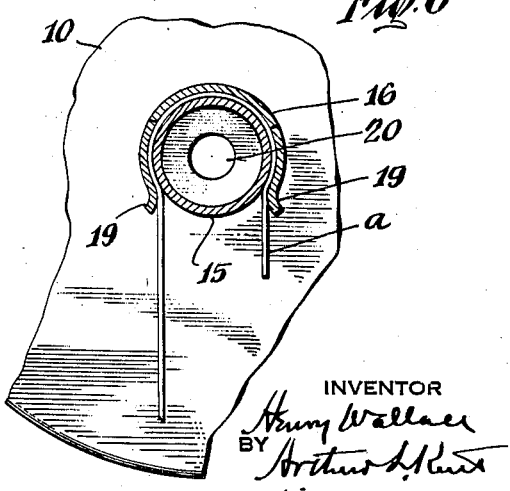
INVENTOR
Henry Wallace
BY
his ATTORNEY Patented Dec. 14, 1937

2,102,446

UNITED STATES PATENT OFFICE 2,102,446

RIBBON REEL

Henry Wallace, New York, N. Y.

Application March 11, 1937, Serial No. 130,286

2 Claims. (Cl. 242—70)

This invention relates to ribbon spools, or reels, for typewriter ribbons. The object of the invention is to provide an improved reel to which the end of the ribbon may be readily connected without requiring any hook or eye or other device to be provided on the end of the ribbon.

The invention has been made especially with the idea of facilitating the attachment of the free end of a new typewriter ribbon to the empty spool when a new ribbon is to be inserted in the typewriter, and to make this operation of attaching the end of the ribbon to the reel easily and readily performable with little, if any, inking of the operator's fingers.

To these ends the invention consists in a ribbon reel constructed and operating for attachment of a ribbon end as hereinafter described and as defined in the claims.

A full understanding of the invention can best be given by a detail description of a reel embodying the invention in the form now considered best, and such a description will now be given in connection with the acccompanying drawing showing such a reel. In said drawing:—

Fig. 1 is a perspective view of the reel;

Fig. 2 is a sectional view taken on line 2—2 of Fig. 3 but showing a lesser number of turns of the ribbon about the hub;

Fig. 3 is a section taken on line 3—3 of Fig. 2;

Fig. 4 is an edge view of the reel without a ribbon thereon;

Fig. 5 is a view showing the two parts or members of the reel separated prior to assembling them with a ribbon secured to the hub; and Fig. 6 is an enlarged sectional view on line 2—2 of Fig. 3 with the disc broken away and showing a ribbon clamped between the hub and the clamping sheath before the ribbon is wound on the reel.

Referring to the drawing, the reel is made up of two members each comprising one of the two side discs 10 and 11. One of the members consists of the disc 10 and a tubular hub 15 extending therefrom and located centrally thereof. The other member consists of the disc 11 and a part-cylindrical sheath 16 extending from the central portion thereof made of thin spring steel or other suitable resilient and elastic material which is secured to the disc by a middle portion 17 of the end thereof, most desirably by having such middle portion extend through an arcuate slot 18, the end of the sheath on each side of the connecting portion 17 being free from the disc so that the two longitudinal edges 19 and adjacent side portions of the sheath are free to flex slightly outwardly, and the sheath is of a size to fit closely about the hub 15. The longitudinal edges of the sheath are turned slightly outward as shown so that the sheath may be positioned on the hub by moving the discs relatively edgewise to press these two parts together in the direction transverse of their axes, the sides of the sheath being flexed outward as its longitudinal edges pass over the hub and the sides springing back when the hub and sheath are in concentric relation, the sheath then extending closely about the hub so as to grip the portion of a ribbon interposed between them. Each of the discs has a central opening 20 for receiving the pin or standard of the typewriting machine by which the disc is positioned rotatably in the machine.

In connecting a ribbon to the reel, the two parts or members of the reel are first separated. The end of the ribbon $a$ is then placed about the hub as shown in Fig. 5, and the two discs are brought into relative position parallel to each other so that the sheath will be parallel with the hub with its open side toward the hub, and the discs are then moved edgewise to press the sheath on to the hub, as shown in Fig. 6. The ribbon will then be firmly gripped between the sheath and hub and the two discs will be in suitably spaced concentric relation. Then, when the reel is turned, the ribbon will be wound around the sheath and hub, which form the hub structure of the assembled reel, the winding of the ribbon about the hub structure being illustrated by Figs. 2 and 3.

Instead of looping the ribbon over the hub tube 15, the ribbon may be positioned across the open side of the sheath so that in the assembling of the two members of the reel the ribbon will be forced into the sheath by the hub tube to be gripped between these parts as before.

It will be seen that to release the ribbon it is necessary only to move the two reel members in opposite directions edgewise of the discs so as to withdraw the hub tube from the sheath.

What is claimed is:

1. A ribbon reel, comprising two separable parts, one part comprising a disc and a tubular hub extending therefrom, and the other part comprising a disc and a part-cylindrical spring sheath extending therefrom adapted to be forced on to the hub by relative edgewise movement of the discs, the longitudinal edges of the sheath being turned outward and the side portions of the sheath adjacent its longitudinal edges being free of the disc to flex outwardly to receive the hub, and the sheath being of a size to fit closely about the hub to grip the ribbon between the sheath and the hub.

2. A ribbon reel, comprising two separable parts, one part comprising a disc and a tubular hub extending therefrom, and the other part comprising a disc and a part-cylindrical spring sheath extending therefrom adapted to be forced on to the hub by relative edgewise movement of the discs, the end of the sheath adjacent its disc having a central portion thereof secured to the disc and the side portions of the sheath adjacent its longitudinal edges being free of the disc so that the two side portions of the sheath are free to flex outwardly to receive the hub, and the sheath being of a size to fit closely about the hub to grip the ribbon between the sheath and the hub.

HENRY WALLACE.